H. B. WHITE.
SADDLETREE.
APPLICATION FILED APR. 2, 1909.
1,055,248.
Patented Mar. 4, 1913.
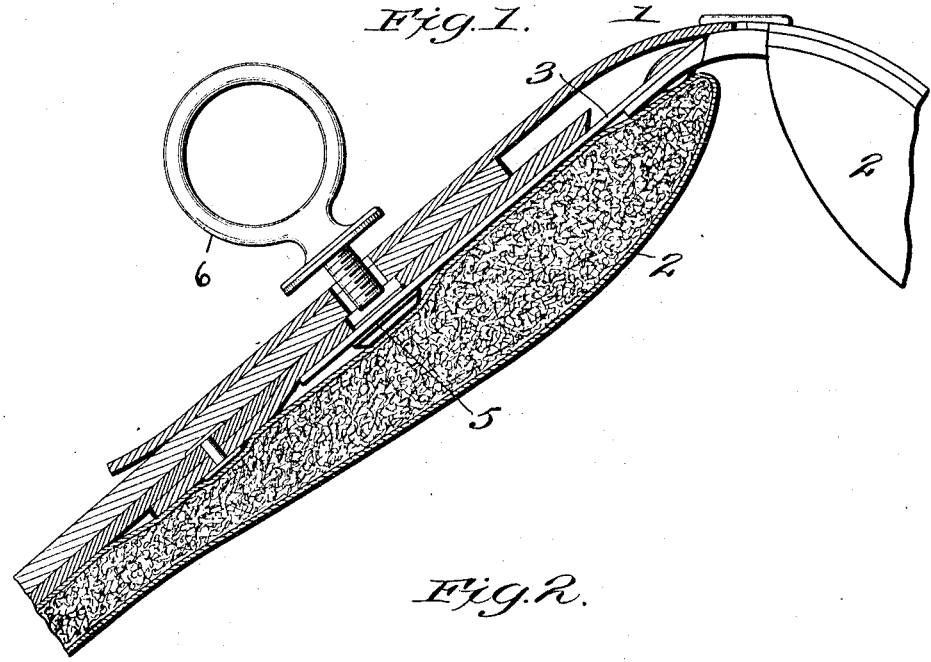
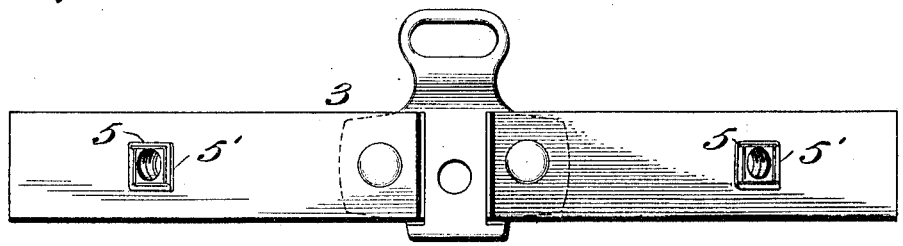
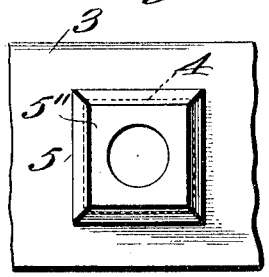
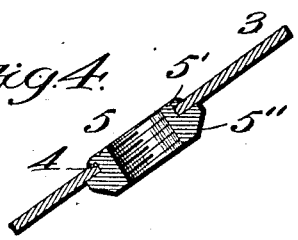
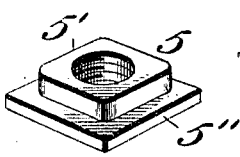
Witnesses
Geo. A. Bepue
G. M. Copenhaver
Inventor
Harry B. White
By Edward R. Alexander
Attorney
COLUMBIA PLANOGRAPH CO., WASHINGTON, D. C.

UNITED STATES PATENT OFFICE.

HARRY B. WHITE, OF CANTON, OHIO, ASSIGNOR TO THE GILLIAM MANUFACTURING COMPANY, OF CANTON, OHIO, A CORPORATION OF OHIO.

SADDLETREE.

1,055,248.  Specification of Letters Patent.  Patented Mar. 4, 1913.

Application filed April 2, 1909. Serial No. 487,391.

*To all whom it may concern:*

Be it known that I, HARRY B. WHITE, a citizen of the United States, residing at Canton, in the county of Stark and State of Ohio, have invented certain new and useful Improvements in Saddletrees, of which the following is a specification, reference being had therein to the accompanying drawings.

This invention relates to a saddle tree, particularly a harness saddle tree.

One object of the invention is to provide novel means for securing the terret, or other nuts or screws in place on a saddle tree.

Another object of the invention is to provide means for securing to a saddle tree a polygonally shaped nut whereby it will be permanently retained in position and not work loose under ordinary conditions of use.

A further object of the invention is to provide in saddle trees having apertures to receive the terret, or other, nuts, means for securing the nuts in said apertures and for reinforcing the walls of said apertures.

Referring to the drawings—Figure 1 is an elevation of a harness saddle, partly broken away to show a saddle tree having my invention applied thereto. Fig. 2 is a top plan view of the saddle tree. Fig. 3 is a bottom plan view. Fig. 4 is a longitudinal section through the terret nut and a portion of the saddle tree frame. Fig. 5 is a perspective view of a nut before it is attached to a saddle tree.

In the drawings, 1 indicates a harness saddle, 2 indicates the pads, and 3 indicates the saddle tree. The parts just referred to may be constructed in any suitable or preferred manner.

4 indicates polygonally shaped apertures formed in the opposite side members of the tree and adapted to receive nuts 5. Each of the nuts 5 has a body portion 5', corresponding in shape and size to an aperture 4, and an enlarged or flanged portion 5''. Each nut 5 is preferably inserted into an aperture 4 from the lower side of the tree so that the flange 5'' engages the lower surface thereof and it is threaded to receive the shank or stem of a terret 6. The upper end of each nut 5 or that end of the nut opposite to the flange 5'' is upset upon or riveted to the upper surface of the tree 3 for the purpose of permanently securing the nut to the tree and for reinforcing the walls of the adjacent aperture 4.

The construction of tree and nuts above described is preferably used in securing other or additional nuts or screws to the tree, such for instance the nuts that receive the bolts which secure the jockey or skirts to the saddle.

The upsetting or riveting of the unflanged end of the terret nut 5 upon the adjacent face of the metal forming the tree frame results first in arranging integral portions of the metal forming the nut outside the walls of the opening 4, and secondly, such upsetting or riveting operation forces the metal forming the walls of said opening into close and intimate contact with the side walls of the nut 5 as well as with the inner faces of the flange 5''. As a result of this operation all space between the terret nut and tree frame is closed up. Also the metal forming the opposite faces of the tree frame immediately adjacent to the walls of the opening is reinforced, and thus prevents the nut from being drawn through the opening by any force used in screwing the terret into position.

The advantages of the construction described are that by upsetting or riveting the unflanged end of the nut to the tree, the nut is permanently fixed thereto around its entire perimeter, and as all the space between the sides of the nut and the walls of the aperture 4 is taken up by the riveting or upsetting process the nut cannot enlarge the aperture or work loose and thus get misplaced when a terret stem or a bolt is unscrewed.

What I claim is:

The combination, in a harness saddle, of a metal tree having flat upper and lower surfaces and formed with a polygonally shaped opening, and a terret nut flanged at one end and having a body portion corresponding in shape to said opening and snugly fitted therein, the inner face of the flange being flat and arranged to lie against one face of the tree and the opposite end of the nut being upset on all sides against the other face of the tree and coöperating with the flange at the other end thereof to reinforce the metal forming the opposite faces of the tree and immediately adjacent to and surrounding the opening therein, the upsetting of the nut operating to force the metal forming the walls of said opening into close engagement with the sides of the body portion of said nut.

In testimony whereof I affix my signature in the presence of two witnesses.

HARRY B. WHITE.

Witnesses:
J. WHITING, Jr.,
BERTHA OBRINGER.

Copies of this patent may be obtained for five cents each, by addressing the "Commissioner of Patents. Washington, D. C."